June 28, 1938.  H. BARNARD  2,122,126
HOSE END STRUCTURE
Filed March 19, 1937
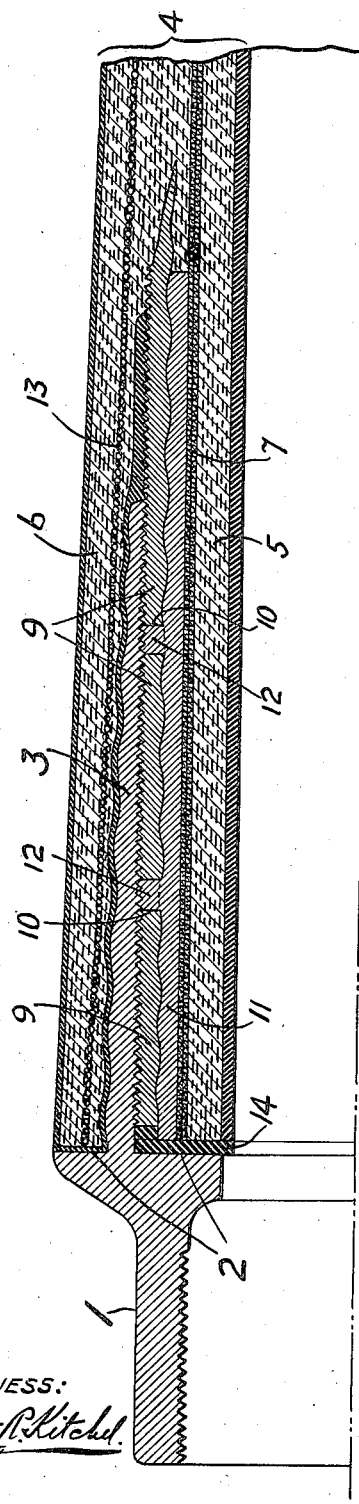
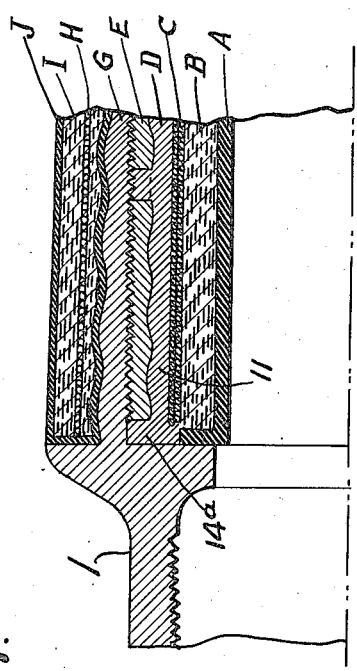
WITNESS:
INVENTOR
Harold Barnard
BY
Augustus B. Stoughton,
ATTORNEY.

Patented June 28, 1938

2,122,126

UNITED STATES PATENT OFFICE 2,122,126

HOSE END STRUCTURE

Harold Barnard, Houston, Tex., assignor to Whitehead Brothers Rubber Company, Trenton, N. J., a corporation of New Jersey Application March 19, 1937, Serial No. 131,895

4 Claims. (Cl. 285—72)

The principal object of the present invention is to provide a hose end structure for rotary hose used in oil and other drilling and for other purposes and which will withstand and safely convey water, or other fluid, under very high pressure.

Another object of the invention is to provide a hose end structure for the purpose indicated which shall be of comparatively inexpensive construction and at the same time capable of doing the work required of it.

Other objects of the invention will appear from the following description, at the end of which the invention will be claimed.

Generally stated the invention comprises a duck and rubber hose embodying in its construction longitudinally disposed metal reinforcements and a metal coupling element, there being interposed between the two a joint of low melting point metal, as lead, lead alloy or solder, in which the end portions of the metallic reinforcement are embedded or set and which is adherent to the metal coupling element.

The invention also comprises the improvements to be presently described and finally claimed.

In the following description reference will be made to the accompanying drawing forming part hereof and in which:

Figure 1 is a longitudinal sectional view of one-half of a hose end structure embodying features of the invention and selcted from other embodiments for the sake of illustration; and Fig. 2 is a fragmentary view similar to Fig. 1 and illustrating a modification.

Referring to the drawing, 1 indicates a coupling shank having an end face 2, and a tubular nipple 3, projecting from the face and internally threaded and externally corrugated or otherwise roughened. 4 indicates a rubber lined and rubber covered duck and rubber hose. The carcass of the hose at the end portion is formed with an inner straight tubular part 5 and an outer flaring tubular part 6. The inner straight tubular part is externally wire wound as at 7. Usually this winding is intended to resist strain in a longitudinal direction and it may consist of multiple strands of wire, mesh material, or woven tape and these may be wound in multiple ends and in spirals disposed in the same or in opposite directions. The ends of these reinforcements are set and held in a lead wiped joint. In this description and in the claims the term "lead" is used to include solder and lead alloys fusible at comparatively low temperatures. 9 is a metal sleeve internally corrugated and externally threaded and provided with perforations 10. This sleeve 9 is threaded into the nipple 3 of the shank 1. There is a lead joint 11 between the corrugated inside of the sleeve and the lead wiped winding 7 and there are in this joint studs 12 extending thru the perforations in the sleeve. 13 are tieing wires embedded in the outer tubular flaring part of the carcass and binding it on to the corrugated outer surface of the nipple. 14 is a washer interposed between the end face 2 of the shank of the coupling and the end of the hose.

The construction of the modification illustrated in Fig. 2 is substantially as above described except that in Fig. 1 the washer 14 is of hard rubber, whereas in Fig. 2 washer 14ª is of lead and is a part of the lead joint 11.

For the sake of clearness it may be said that referring to Fig. 2 and from the inside the hose end comprises a rubber tube A; fabric, duck and rubber B; wire embedded in lead C; lead alloy D; steel sleeve E; nipple G; wire tieing spiral H; fabric I and rubber cover J.

Spiral strands when used for resisting endwise pressure in a hose are usually wound in groups and they are wound all under the same tension so that they may all act together in resisting strain. When a hose so wound is applied to a coupling, it is submitted to pressure with the result that the tension of the reinforcements is no longer even, so that when lengthwise pressure is exerted upon the hose the strands or some of them act individually and not as a group, with the result that the individual strands break and leaks and destruction ensue. The metal joint above described in which the end parts of the strands are embedded, operates to preserve an even distribution of tension among the strands so that they act as a body and not individually, thus greatly strengthening the hose end of the structure. The metal joint also operates as do the studs 12 to firmly attach the hose to the coupling so that it may not pull loose even under very high internal pressure.

It will be understood that the hose end is in large part built up on the coupling shank. However, the sleeve 9 is placed around and spaced from the inner tubular part of the carcass, but prior to that the wire reinforcements 7 are lead wiped. With the sleeve in place around the inner part of the carcass lead is run through the perforations in the sleeve so as to provide the lead joint. The perforations themselves provide the lead studs 12. The sleeve may be centered around the inner tubular part of the carcass by inserting small wedges at the end. To prevent or oppose lead from running out from the perforations in the sleeve the perforations through which the lead is not poured may be stopped by a sheet of tin arranged to cover them.

It will be obvious to those skilled in the art to which the invention relates that modifications may be made in details of construction and arrangement without departing from the spirit of the invention which is not limited in respect to such matters or otherwise than as the prior art and the appended claims may require.

I claim:

1. A hose end structure comprising in combination a coupling shank having an end face and a tubular nipple spaced outward from the bore of the coupling and projecting from the face and internally threaded and externally corrugated, a rubber lined and rubber covered duck and rubber hose having its carcass formed at one end into an inner straight tubular part and an outer flaring tubular part, the inner straight tubular part being externally wire wound and lead wiped, a metal sleeve internally corrugated and externally threaded for engagement with the thread on the inside of the nipple, a lead joint between the corrugated inside of the sleeve and the lead wiped winding and having studs extending into perforations provided in the sleeve, tieing wires embedded in the outer tubular flaring part of the carcass and binding it on to the corrugated surface of the nipple, and a washer interposed between said end face and the end of the hose.

2. In a hose end structure the combination of a coupling shank having a nipple, a sleeve having screw thread engagement with the inside of the nipple, a duck and rubber hose having one end of its carcass formed into an inner tubular part arranged inside and spaced from the sleeve and an outer tubular part arranged outside of the nipple, a winding of metal strands on the outside of the inner part of the carcass, and a fusible metal joint interposed between the inner part of the sleeve and the outside of the inner part of the carcass and in which the ends of the strands are embedded and set.

3. A hose end structure comprising, a coupling shank having a shoulder intermediate the ends thereof, a sleeve having detachable engagement with said shank so as to be adjustable thereto, and a hose mounted on said shank and on said sleeve and having a portion interposed between said shank and said sleeve so as to be clamped therebetween.

4. A hose end structure comprising in combination, a coupling shank having an internal and an external shoulder intermediate the ends thereof, one end of said shank against which a portion of a hose section is adapted to be held with one end thereof abutting the external shoulder being roughened, the opposite end of said shank being internally threaded for co-operating with an externally threaded pipe section or the like, a sleeve having detachable engagement with said shank so as to be adjustable relative thereto, one end of another portion of said hose section being adapted to be clamped between the internal shoulder of said shank and the inner end of said sleeve.

HAROLD BARNARD.